United States Patent [19]

Bedi et al.

[11] Patent Number: 5,588,502
[45] Date of Patent: Dec. 31, 1996

[54] QUICK CONNECT NIPPLE HAVING A CYLINDRICAL MAGNET

[75] Inventors: Ram D. Bedi; Adrianus J. van der Griendt, both of Bloomfield Hills, Mich.

[73] Assignee: K. J. Manufacturing Co., Wixom, Mich.

[21] Appl. No.: 521,596

[22] Filed: Aug. 30, 1995

[51] Int. Cl.⁶ ...................................................... F16C 3/14
[52] U.S. Cl. ............................ 184/1.5; 141/98; 184/109; 210/222
[58] Field of Search ................................ 184/1.5; 141/98; 285/316, 9.1; 251/149.6; 210/222

[56] References Cited

U.S. PATENT DOCUMENTS

| | | | |
|---|---|---|---|
| 1,320,624 | 11/1919 | Kevn | 210/222 |
| 2,704,156 | 3/1953 | Botstiber | 210/1.5 |
| 2,983,385 | 10/1958 | Botstiber | 210/222 |
| 3,283,905 | 11/1966 | Cass | 210/222 |
| 3,351,203 | 11/1967 | Robb | 210/222 |
| 3,800,914 | 4/1974 | Miyata | 210/222 |
| 3,869,391 | 3/1975 | Kramer | 210/222 |
| 4,004,298 | 1/1977 | Freed | 285/9.1 |
| 4,478,711 | 10/1984 | Cohen et al. | 209/39 |
| 4,933,151 | 6/1990 | Song | 210/222 |
| 5,224,604 | 7/1993 | Duczmal et al. | 209/12 |

*Primary Examiner*—Thomas E. Denion
*Attorney, Agent, or Firm*—Young & Basile, P.C.

[57] ABSTRACT

A unitary device for a vehicle for removing spent oil from an oil pan reservoir installed in an access aperture located in a floor bottom of the oil pan reservoir. The device includes a quick connect nipple having a first end threadably sealing into the access apertures and a second end releasably engageable with a mating fitting positioned on an externally located fluid delivery device and further having a fluid tight closure when the second end is disengaged from the fluid delivery device. The quick connect nipple includes a throughbore from the first end to the second end for the passage of spent oil when the second end is engaged with the fluid delivery device and a cylindrical magnet secured to the first end of the quick connect nipple for capturing metallic material in the oil pan reservoir as the oil passes through the cylindrical magnet prior to passage in the throughbore.

3 Claims, 1 Drawing Sheet

QUICK CONNECT NIPPLE HAVING A CYLINDRICAL MAGNET

FIELD OF THE INVENTION

This invention relates to a quick connect for an internal combustion engine and especially for the oil sump.

BACKGROUND OF THE INVENTION

The benefits of routine oil changes in an internal combustion engine are well known. Routine oil changes have been shown to increase engine life and performance. With repeated prolonged use, motor oil builds up suspended particles, metallic and non-metallic, from the abrasive and adhesive wear of engine parts against one another and from products of incomplete combustion and improper air intake. The particles, in turn, cause abrasive wear of the engine bearings, piston rings and other moving parts in the reduction of the motor oil lubricity as various additives and lubricating components become depleted. This adversely effects engine performance and if left unchanged, can destroy or cripple the engine performance.

To obtain satisfactory engine performance, changing the motor oil in an internal combustion engine is a necessary, but an undesirable, dirty and time consuming task. In currently designed vehicles, the oil pan serves the purpose of a reservoir for circulation of the engine oil. Engine lubrication is generally accomplished through a gear-type pump. The pump picks up engine oil from the oil pan sump, where oil is drawn up through the pick-up screen and tube and passed through the pump to the oil filter, before going to the engine oil galleries. In the filter, the oil passes through a filtering element where dirt and foreign particles are removed.

To remove the contaminated oil, the drain plug generally located in the lowermost region of the oil pan is open. Spent oil containing suspended particles is permitted to flow under gravity out of the pan into a suitable receptacle. After the spent oil is removed, the plug is replaced and fresh oil is added to the engine usually through a separate opening in the engine valve cover.

The oil change process is essentially the same whether performed at home, at service stations or at one of the various oil change centers which have opened in recent years. The flow rate, or time required for oil drainage is almost the same for each of these locations because it is limited by the size of the drain plug aperture and the force of gravity. In other oil change procedures which include enhancements or improvements, the oil is removed by suction through a conduit placed in communication with the oil pan drain plug opening. This increases the risk of oil loss through the drain plug and engine destruction due to engine operation without sufficient lubrication.

It is desirable to provide a convenient, environmentally safe, no-mess alternative to conventional oil changes which reduces the time and labor required in the process and reduces the chances for oil spillage before, during and after the oil change operation. It is also desirable to provide an apparatus and method which provide a unified, streamlined process for oil change operations which supports and complies with the spirit and intent of existing and proposed legislation regarding handling safety waste reduction, pollution abatement and conservation of natural resources. It is also desirable to provide an oil pan adapter device which would eliminate the need for repeated removal and reinsertion of the drain plug with each oil change operation, and that is suitably configured to permit automatic sealing between oil change operations. Finally, it is desirable to provide a means to capture metallic particles suspended in the oil in the oil sump before the particle can enter the oil pan adapter device.

SUMMARY OF THE INVENTION

The device of the present invention addresses the aforementioned concerns. To accelerate the removal of the spent oil conveniently, more completely, and easily from the crank case, a vacuum pump means is connected to the drain aperture to create vacuum within the spent oil container thereby drawing spent oil from the oil pan of the engine into the environmentally safe spent oil container external of the engine. A quick connect nipple is provided in the drain aperture that is adaptable for communication with the pump means including the vacuum means such that subsequent oil changes will merely require the hook-up of the quick connect to a vacuum pump means engageable with a spent oil receptacle.

The device of the present invention includes a quick connect nipple releasably connected to the drain plug opening of the oil pan. The quick connect nipple is matingly and sealingly engageable with the drain plug opening and is matingly and sealingly engageable with a fitting located on a fluid egress conduit which is connected to a fluid storage receptacle through a suitable pump means. The quick connect nipple has a centrally located throughbore and means for effecting positive no spill closure of the fitting when the fitting is disengaged from the mating member. The positive closure means is preferably located proximate to the outlet end of the fitting member. Because of the internal configuration of a quick connect nipple, it is highly desirable that minute particles of iron and steel which become entrained in the lubricant be removed before such particles embed within the quick connect and prevent the ultimate seal of the quick connect. It is thus important that such particles be removed as rapidly as possible to prevent damage to the quick connect nipple. A ring-shaped, or cylindrical shaped magnet having a center passage is secured at the inlet end of the fitting member adjacent to the throughbore to capture the metallic particles before the particles can arrive at the positive closure means.

In the oil change and optionally flush cleaning operation, spent or dirty oil is removed from the oil pan by coupling the fluid quick connect member with a mating fitting located on a suitable externally positioned fluid removal device. As the external fluid removal device pumps the spent oil from the pan, the oil must pass through the center passage of the cylindrical magnet wherein the metallic particles are subject to the magnetic force and adhere to the magnet.

Once spent oil has been removed, a new fresh oil filter unit can be installed if necessary and an amount of fresh oil appropriate for the internal combustion engine can be introduced at will into the engine and the lube oil distribution passage system.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
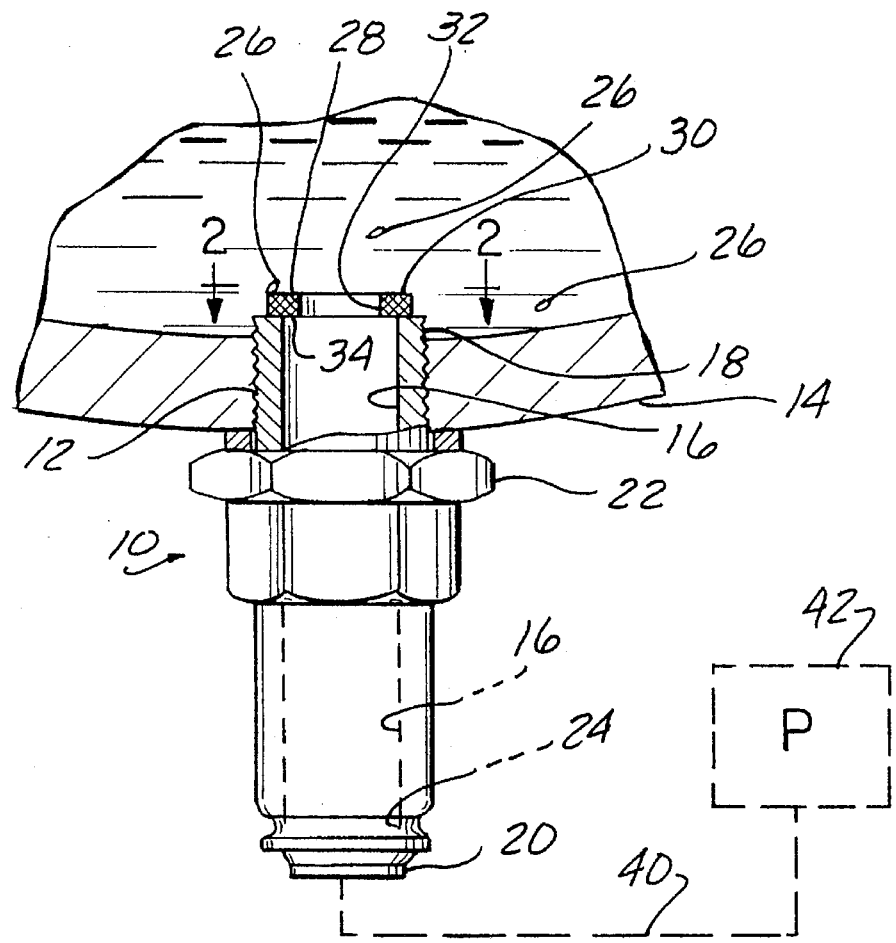
FIG. 1 is an elevational view, partly in section, showing a quick connect nipple having a magnetic first end depicted in place in an oil pan reservoir illustrated in fragmentary section.
Figure 2:
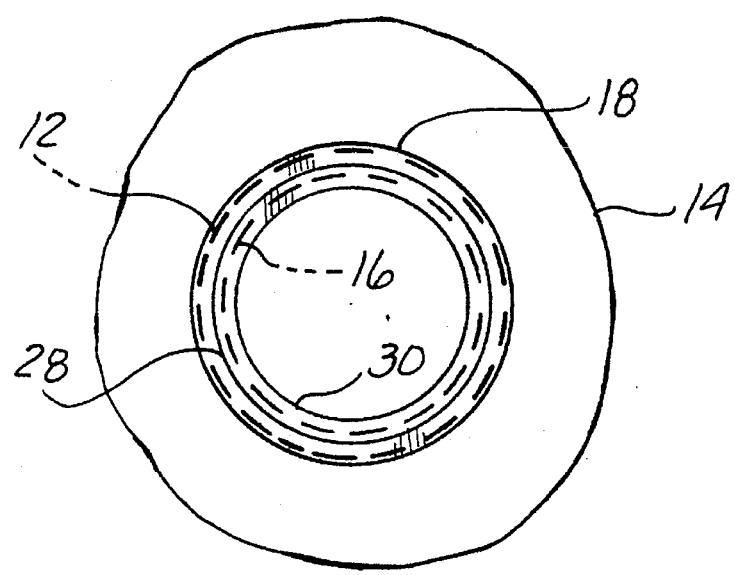
FIG. 2 is a transverse sectional view taken on line 2—2 of FIG. 1.

The present invention facilitates the oil change process performed on an internal combustion engine by including a modification to include a fluid egress nipple fitting 10 releasably and sealingly positioned in the drain opening 12 of an associated oil pan or sump 14 as shown in FIG. 1. The fluid egress nipple or quick connect nipple 10 of the present invention is a fitting adapted to be matingly and sealingly connected to a suitable external fluid egress hose 40. The fluid egress nipple 10 is preferably a unitary construction, but alternatively, may be a multi-part construction. The fluid egress nipple 10 of the present invention generally has a hollow internal fluid conveying conduit or throughbore 16 defined therein and includes means for sealingly connecting the egress nipple 10 to the drain opening 12 of the associated oil pan 14 for permitting controlled fluid egress. In the embodiment shown in FIG. 1, the fluid egress nipple 10 includes a first threaded region 18 receivable within a mating region in the drain opening of the associated oil pan 14, and a second end 20 opposed to the first end 18 which is sealingly connectible with a mating fitting located on an external fluid egress hose 40. The nipple 10 may also include an intermediately disposed outwardly facing geometric surface 22 defined thereon for facilitating insertion of the nipple into the associated oil pan drain opening 12.

The fluid egress nipple 10 also includes means for effecting sealing closure of the fluid egress nipple 10 when uncoupled from the mating fitting located on the external fluid egress hose. In the preferred embodiment, the quick connect nipple includes means for effecting positive sealing closure of the fluid egress nipple 10 by employing a positive sealing element 24 therein. Examples of suitable quick connect nipples having positive closure elements are the NO-SPILL series commercially available from the Parker-Hannifin Corporation.

Metallic particles 26 that are produced by the movement of the internal combustion engine are flushed to the oil sump 14 by the action of the oil through the oil distribution passages. To prevent these particles 26 from flowing into the fluid egress nipple 10 and becoming embedded into the positive sealing element 24, which may freeze the positive sealing element in an open position, it is the intent of the invention to position a ring-shape or cylindrical magnet 28 having a center passage 32 in the flow path of the oil during the oil changing process. It is preferred to securely attach the magnet 28 at the first end 18 of the nipple fitting 10 so that easy access to the metallic particles 26 is available for cleaning when the fluid egress nipple 10 is removed from the drain opening 12. It is also preferable to have the maximum available surface area of the magnet 28 exposed to the oil in the oil sump 14 in order to expose the magnet 28 to a greater number of metallic particles 26. Therefore, the cylindrical magnet 28 is positioned at the entrance to the nipple 10 so that an upper surface 30 of magnet 28 is exposed to the fluid in the sump 14 and so that the oil flows through the center passage 32 of the cylindrical magnet before entering throughbore 16. Although a single cylindrical magnet 28 secured to the first end 18 of the fluid egress nipple 10 is preferred, a plurality of small magnets may be secured in circular fashion to the first end 18 of nipple 10 to achieve similar results.

During the oil changing process, the spent oil passes through the cylindrical magnet 28 to the hollow internal fluid conveying conduit 16. Magnetized particles 26 that may be suspended in the oil are swept by the oil toward the cylindrical magnet 28 as the oil flows through the fluid egress nipple 10. In addition, oil agitation provided at the first end 18 of the nipple 10 during the oil changing process as a result of the external vacuum pump 42 will expose a greater quantity of suspended particles 26 to magnet 28.

The quick connect nipple 10 can be threadably removed from the drain opening 12 to inspect for and dislodge the metallic particles 26 from magnet 28; wherein the quick connect nipple 10 can then be reinstalled into the drain opening 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A one-piece device for a vehicle for changing oil in an internal combustion engine having an oil pan reservoir, the oil pan reservoir having a floor bottom and an access aperture in the floor bottom; the device comprising:

a quick connect nipple having a first end threadably mating into the access aperture and a second end releasably engageable with a mating quick connect fitting positioned on an externally located fluid delivery device, and having a throughbore therebetween;

means for establishing fluid tight closure of said quick connect nipple when said nipple is disengaged from said fluid delivery device; and a magnet secured to the first end of the quick connect nipple for capturing metallic material in the oil pan reservoir, said magnet having a through center passage and an upper end exposed to fluid in the oil pan reservoir, said magnet positioned adjacent the throughbore so that oil passes through the center passage of the cylindrical magnet prior to entering the throughbore during the oil changing process.

2. The one-piece device of claim 1, wherein the magnet is a single cylindrical magnet.

3. The one-piece device of claim 1, wherein the magnet includes a plurality of magnets secured to the first end in a circular fashion.

\* \* \* \* \*